United States Patent
Sayenko et al.

(10) Patent No.: US 12,507,220 B2
(45) Date of Patent: Dec. 23, 2025

(54) SYSTEMS AND METHODS FOR SIGNALING NON-TERRESTRIAL BAND IDENTIFIERS

(71) Applicant: Apple Inc., Cupertino, CA (US)

(72) Inventors: Alexander Sayenko, Munich (DE); Anatoliy S Ioffe, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 656 days.

(21) Appl. No.: 17/697,764

(22) Filed: Mar. 17, 2022

(65) Prior Publication Data
US 2022/0322350 A1 Oct. 6, 2022

Related U.S. Application Data

(60) Provisional application No. 63/169,583, filed on Apr. 1, 2021.

(51) Int. Cl.
*H04W 72/0453* (2023.01)

(52) U.S. Cl.
CPC .............................. *H04W 72/0453* (2013.01)

(58) Field of Classification Search
None
See application file for complete search history.

(56) References Cited

U.S. PATENT DOCUMENTS

| | | | | |
|---|---|---|---|---|
| 5,796,726 A * | 8/1998 | Hassan | .................. | H04B 7/212 370/344 |
| 8,346,161 B2 * | 1/2013 | Sogabe | ................ | H04B 7/2045 455/12.1 |
| 10,419,106 B1 * | 9/2019 | Liu | ........................ | H04L 67/568 |
| 11,962,391 B2 * | 4/2024 | Beckner | .............. | H04B 7/18504 |
| 2002/0055360 A1 * | 5/2002 | Chen | ..................... | H04W 16/00 455/452.2 |
| 2005/0063487 A1 * | 3/2005 | Sayegh | .............. | H04B 7/18513 375/316 |
| 2005/0260948 A1 * | 11/2005 | Regulinski | ......... | H04B 7/18563 455/12.1 |
| 2005/0273822 A1 * | 12/2005 | Snell | ................ | H04N 21/26216 725/63 |

(Continued)

FOREIGN PATENT DOCUMENTS

| CA | 3165615 A1 * | 9/2021 | .......... H04W 52/028 |
|---|---|---|---|
| CN | 107431957 A | 12/2017 | |

(Continued)

OTHER PUBLICATIONS

WO2009128303 (Year: 2009).*

(Continued)

*Primary Examiner* — Christopher T Wyllie
(74) *Attorney, Agent, or Firm* — Fletcher Yoder, P.C.

(57) ABSTRACT

This disclosure provides various techniques for enabling user equipment to communicate with a non-terrestrial communication hub or network of non-terrestrial communication hubs via a non-terrestrial network (NTN). By conforming NTN communications to standards and regulations for terrestrial cellular communications, network capabilities of the user equipment may be enhanced. This may be accomplished by defining frequency band identifiers (IDs) for NTN frequency bands and various uplink and downlink frequencies within the NTN frequency bands.

20 Claims, 7 Drawing Sheets

(56) References Cited

U.S. PATENT DOCUMENTS

| | | | |
|---|---|---|---|
| 2010/0035553 A1* | 2/2010 | Shinada | H04W 48/16 |
| | | | 455/62 |
| 2015/0133117 A1* | 5/2015 | Lauer | H04W 76/10 |
| | | | 455/435.1 |
| 2016/0294794 A1* | 10/2016 | Mancic | H04L 63/0421 |
| 2018/0146483 A1* | 5/2018 | Kobayashi | H04W 72/541 |
| 2019/0239082 A1* | 8/2019 | Ravishankar | H04B 7/18528 |
| 2020/0314769 A1* | 10/2020 | Furuichi | H04W 52/362 |
| 2021/0014696 A1* | 1/2021 | Brookes | G06F 16/29 |
| 2021/0014870 A1* | 1/2021 | Kim | H04W 24/08 |
| 2021/0144562 A1* | 5/2021 | Ananth | H04B 7/18504 |
| 2021/0242935 A1 | 8/2021 | Sakhnini et al. | |
| 2021/0359752 A1* | 11/2021 | Wang | H04W 24/02 |
| 2022/0046669 A1* | 2/2022 | Wang | H04L 1/1893 |
| 2022/0070752 A1* | 3/2022 | Kim | H04W 24/08 |
| 2022/0095303 A1* | 3/2022 | Colucci | H04W 72/0453 |
| 2022/0109496 A1* | 4/2022 | Shrestha | H04B 7/18519 |
| 2022/0137234 A1* | 5/2022 | Syrjärinne | G01S 19/32 |
| | | | 342/357.61 |
| 2022/0225195 A1* | 7/2022 | Park | H04W 48/20 |
| 2022/0295291 A1* | 9/2022 | Sugaya | H04W 16/14 |
| 2022/0302997 A1* | 9/2022 | Beeler | G06N 20/20 |
| 2022/0322350 A1* | 10/2022 | Sayenko | H04B 7/18539 |
| 2022/0352971 A1* | 11/2022 | Liberg | H04B 7/18519 |
| 2022/0376779 A1* | 11/2022 | Atungsiri | H04B 7/1851 |
| 2022/0394648 A1* | 12/2022 | Lin | H04W 56/0045 |
| 2023/0116580 A1* | 4/2023 | Cheng | H04W 56/0035 |
| | | | 370/329 |
| 2023/0262672 A1* | 8/2023 | Lin | H04L 5/0007 |
| | | | 370/329 |
| 2024/0014888 A1* | 1/2024 | Wang | H04B 7/18563 |
| 2024/0022913 A1* | 1/2024 | Medles | H04B 7/18513 |
| 2024/0155451 A1* | 5/2024 | Zhu | H04W 72/541 |

FOREIGN PATENT DOCUMENTS

| | | | | |
|---|---|---|---|---|
| EP | 3893537 A | | 6/2020 | |
| EP | 4024959 A1 | * | 7/2022 | H04W 36/0058 |
| WO | WO-2007135902 A1 | * | 11/2007 | H04B 7/2045 |
| WO | WO-2008029686 A2 | * | 3/2008 | H04B 7/06956 |
| WO | WO-2009128303 A1 | * | 10/2009 | H04L 5/0042 |
| WO | 2016164087 A1 | | 10/2016 | |
| WO | 2019215288 A1 | | 11/2019 | |
| WO | 2020114276 A1 | | 6/2020 | |
| WO | WO-2022079460 A1 | * | 4/2022 | H04B 7/18504 |

OTHER PUBLICATIONS

Indian Examination Report for Indian Patent Application No. Office 202214017949 dated Dec. 22, 2022; 6 pgs.

Extended European Search Report for EP Patent Application No. 22164569.0 dated Jul. 25, 2022; 8 pgs.

* cited by examiner

700 ⟶

| BAND ID | UL (MHz) | DL (MHz) | TYPE |
|---|---|---|---|
| N41 | 2496–2690 | 2496–2690 | TDD |
| N1 | 1920–1980 | 2110–2170 | FDD |
| N100 | 1980–2010 | 2170–2200 | FDD SAT |
| N102 | 1626.5–1660.5 | 1518–1559 | FDD SAT |

| | BAND | DL BAND ID | UL BAND ID |
|---|---|---|---|
| 752 | TDD | N41 | N/A |
| 754 | FDD | N1 | N1 |
| 756 | FDD SAT | N100 | N100 |
| 758 | FDD SAT | N100 | N102 |
| 760 | FDD SAT | N102 | N100 |

| BAND ID | UL (MHz) | DL (MHz) | TYPE |
|---|---|---|---|
| N41 | 2496–2690 | 2496–2690 | TDD |
| N1 | 1920–1980 | 2110–2170 | FDD |
| N100 |  | 2170–2200 | DL SAT |
| N101 | 1980–2010 |  | UL SAT |
| N102 |  | 1518–1559 | DL SAT |
| N103 | 1626.5–1660.5 |  | UL SAT |

| | BAND | DL BAND ID | UL BAND ID |
|---|---|---|---|
| 852 | TDD | N41 | N/A |
| 854 | FDD | N1 | N1 |
| 856 | FDD SAT | N100 | N101 |
| 858 | FDD SAT | N100 | N103 |
| 860 | FDD SAT | N102 | N101 |

FIG. 6B

SYSTEMS AND METHODS FOR SIGNALING NON-TERRESTRIAL BAND IDENTIFIERS

CROSS-REFERENCE TO RELATED APPLICATIONS

This application claims priority to U.S. Provisional Application No. 63/169,583, filed Apr. 1, 2021, entitled "SYSTEMS AND METHODS FOR SIGNALING SATELLITE BAND INDENTIFIERS," which is hereby incorporated by reference in its entirety for all purposes.

BACKGROUND

In cellular communication, user equipment (e.g., a cellular phone) may communicate with a terrestrial communications hub (e.g., a base station), but may not have non-terrestrial communication capability. However, restricting user equipment to terrestrial communication limits the user equipment's capability and performance.

SUMMARY

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

In one embodiment, a method may include receiving, via at least one processor, a request from user equipment to send data to and receive data from a non-terrestrial communication hub; determining, via the at least one processor, a downlink frequency band and an uplink frequency band; determining, via the at least one processor, a downlink frequency band identifier corresponding to the downlink frequency band and an uplink frequency band identifier corresponding to the uplink frequency band; and sending, via the at least one processor, the downlink frequency band identifier and the uplink frequency band identifier to the user equipment.

In another embodiment, a terrestrial communication hub may include a receiver that may receive data from user equipment, a transmitter that may send data to the user equipment, and at least one processor. The at least one processor may cause the receiver to receive a request from the user equipment to communicate with a non-terrestrial communication hub; determine an available downlink frequency band and an available uplink frequency band; determine a downlink frequency band identifier corresponding to the available downlink frequency band and an uplink frequency band identifier corresponding to the available uplink frequency band; and cause the transmitter to send the downlink frequency band identifier and the uplink frequency band identifier to the user equipment.

In yet another embodiment one or more tangible, non-transitory, machine-readable media may include machine-readable instructions, wherein the instruction may cause at least one processor of user equipment to cause transmission circuitry of the user equipment to transmit a request to send data to and receive data from a network of non-terrestrial communication hubs; cause receiving circuitry of the user equipment to receive a downlink frequency band identifier corresponding to downlink frequencies and an uplink frequency band identifier corresponding to uplink frequencies; cause the transmission circuitry to upload data to the network of non-terrestrial communication hubs over the uplink frequencies; and cause the receiving circuitry to download data from the network of non-terrestrial communication hubs over the downlink frequencies.

BRIEF DESCRIPTION OF THE DRAWINGS

Various aspects of this disclosure may be better understood upon reading the following detailed description and upon reference to the drawings described below in which like numerals refer to like parts.

FIG. 5A includes a table illustrating frequency band definitions using a definition scheme corresponding to a 3GPP standard pairing protocol, according to embodiments of the present disclosure;

FIG. 5B includes a table illustrating signaling (e.g., between the terrestrial communications hub and the user equipment of FIG. 3) indicating various frequencies using the scheme described in FIG. 5A; according to embodiments of the present disclosure;

FIG. 6A includes a table illustrating frequency band definitions that may be used in alternative embodiments to the frequency band definition scheme described in FIG. 5A; according to embodiments of the present disclosure;

FIG. 6B includes a table illustrating signaling (e.g., between the non-terrestrial communication hub and the user equipment of FIG. 3) indicating various frequencies using the scheme described in FIG. 6A, according to embodiments of the present disclosure;

DETAILED DESCRIPTION OF SPECIFIC EMBODIMENTS

Figure 1:
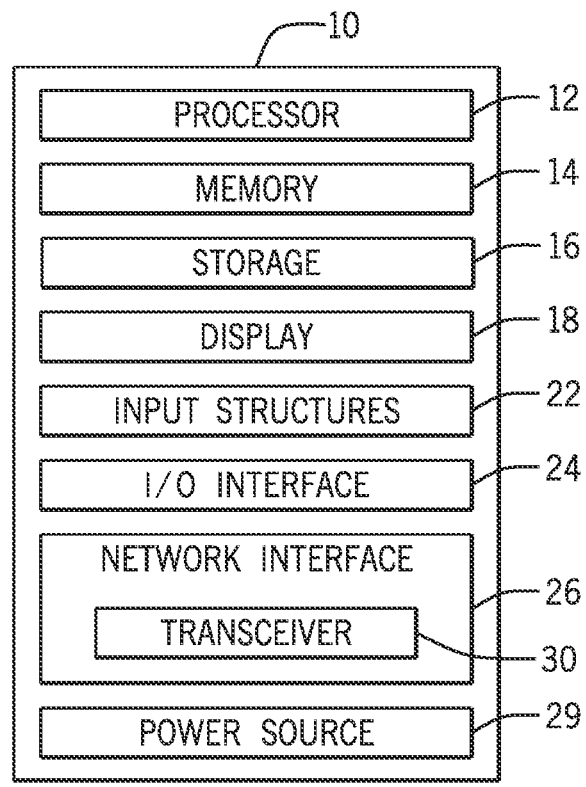
FIG. 1 is a block diagram of an electronic device, according to embodiments of the present disclosure.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features. Furthermore, the particular features, structures, or characteristics may be combined in any suitable manner in one or more embodiments. Use of the term "approximately," "near," "about", and/or "substantially" should be understood to mean including close to a target (e.g., design, value, amount), such as within a margin of any suitable or contemplatable error (e.g., within 0.1% of a target, within 1% of a target, within 5% of a target, within 10% of a target, within 25% of a target, and so on).

The Third Generation Partnership Project (3GPP) provides rules and standards for facilitating communication between user equipment (e.g., cell phones, tablets, smart watches) via a communications hub or a communications node (e.g., a base station). However, the 3GPP may only enable terrestrial communication. By enabling non-terrestrial network (NTN) communication between the user equipment and a non-terrestrial communication hub or node, the communication capability of the user equipment may be expanded and substantially improved. For example, communication between user equipment and the non-terrestrial communication hub may increase data throughput (e.g., when added to ongoing cellular communication) and/or enable the user equipment to continue sending and receiving data in areas in which terrestrial cellular networks are unreachable or have poor performance. As used herein, a NTN may include a satellite network, a high altitude platform system (HAPS) network, an air-to-ground network, and so on.

Additionally, as used herein, a non-terrestrial communication hub may include any airborne or spaceborne object that has been intentionally placed into orbit, such as a conventional spaceborne orbital satellite having a geostationary or geosynchronous orbit (GEO) at approximately 36,000 kilometers, medium-Earth orbit (MEO) at approximately 7,000 kilometers to 20,000 kilometers, or low-Earth orbit (LEO) at approximately 300 meters to 1,500 kilometers. In additional or alternative embodiments, the non-terrestrial communication hub may include any airborne device or vehicle or atmospheric satellite, such as balloon satellites, manned aircraft (e.g., an airplane, an airship, or any other aircraft) or unmanned aircraft systems (UASs), high-altitude platform stations (HAPS). Further, the non-terrestrial communication hub may include a network or constellation of any of the non-terrestrial vehicles, devices, and/or satellites above.

For terrestrial communications, the 3GPP defines bands using band identifiers (IDs), wherein each band ID includes a fixed pair of uplink and downlink frequencies via which the user equipment may communicate with a base station. However, NTN frequency pairs may not follow the same pairing protocol as the 3GPP uses for terrestrial bands. NTN uplink and downlink frequencies may not be fixed, and the uplink and downlink pairs may dynamically change depending on particular deployment cases and scenarios. Further, communication between user equipment and one or more non-terrestrial communication hubs may occur using a variety of NTN-based uplink and downlink frequency bands (e.g., within the L-band of 1.518-1.675 gigahertz (GHz), the S-band of 1.98-2.69 GHz, the Ku-band of 10-14 GHz, the Ka-band of 17-31 GHz, and so on). Moreover, while the numerous uplink and downlink frequency bands may offer flexibility, they may also result in a multitude of uplink and downlink frequency band pairings, each of which may require a corresponding band ID to be generated. Generating, tracking, and storing all possible uplink/downlink permutations may be resource-intensive and burdensome on memory or storage elements.

With the foregoing in mind, the present disclosure provides techniques for enabling and/or facilitating communication between user equipment and a NTN-based telecommunications network, while enabling and facilitating efficient usage and storage of the uplink and downlink frequency bands. To enable cohesive operation between NTN communications and terrestrial cellular communications, it may be useful to conform operation of the user equipment to particular telecommunication standards (e.g., standards promulgated by the 3GPP) when the user equipment establishes communication and communicates with non-terrestrial communication hubs or NTN-based networks.

As previously mentioned, NTN uplink and downlink frequency band pairings may be established and associated with band IDs. In some embodiments a single band ID may serve as an uplink band ID and a downlink band ID (e.g., the uplink and downlink frequency pair is fixed), thus enabling user equipment to upload data to a non-terrestrial communication hub and download data from the non-terrestrial communication hub using a single band ID. In other embodiments, however, the user equipment may upload data to the non-terrestrial communication hub using an uplink band ID corresponding to an uplink frequency band and may download data from the non-terrestrial communication hub using a downlink band ID, distinct from the uplink band ID, corresponding to a downlink frequency band.

In additional or alternative embodiments, each band ID may be associated with only one of an uplink frequency band and downlink frequency band. As such, upon receipt of a band ID sent as the uplink frequency band indicator and a band ID sent as the downlink frequency band indicator, the user equipment may upload data using the uplink frequency band associated with the band ID sent as the uplink frequency band indicator, and download data using the uplink frequency band associated with the band ID sent as the downlink frequency band indicator. In this manner, the number of uplink and downlink frequency band pair permutations may be kept to a more manageable size and facilitate efficient NTN communication with user equipment.

FIG. 1 is a block diagram of an electronic device 10, according to embodiments of the present disclosure. The electronic device 10 may include, among other things, one or more processors 12 (collectively referred to herein as a single processor for convenience, which may be implemented in any suitable form of processing circuitry), memory 14, nonvolatile storage 16, a display 18, input structures 22, an input/output (I/O) interface 24, a network interface 26, and a power source 29. The various functional blocks shown in FIG. 1 may include hardware elements (including circuitry), software elements (including machine-executable instructions) or a combination of both hardware and software elements (which may be referred to as logic). The processor 12, memory 14, the nonvolatile storage 16, the display 18, the input structures 22, the input/output (I/O) interface 24, the network interface 26, and/or the power source 29 may each be communicatively coupled directly or indirectly (e.g., through or via another component, a communication bus, a network) to one another to transmit and/or receive data between one another. It should be noted that FIG. 1 is merely one example of a particular implementation and is intended to illustrate the types of components that may be present in the electronic device 10.

By way of example, the electronic device 10 may include any suitable computing device, including a desktop or notebook computer (e.g., in the form of a MacBook®, MacBook® Pro, MacBook Air®, iMac®, Mac® mini, or Mac Pro® available from Apple Inc. of Cupertino, California), a portable electronic or handheld electronic device such as a wireless electronic device or smartphone (e.g., in the form of a model of an iPhone® available from Apple Inc. of Cupertino, California), a tablet (e.g., in the form of a model of an iPad® available from Apple Inc. of Cupertino, California), a wearable electronic device (e.g., in the form of an Apple Watch® by Apple Inc. of Cupertino, California), and other similar devices. It should be noted that the processor 12 and other related items in FIG. 1 may be embodied wholly or in part as software, hardware, or both. Furthermore, the processor 12 and other related items in FIG. 1 may be a single contained processing module or may be incorporated wholly or partially within any of the other elements within the electronic device 10. The processor 12 may be implemented with any combination of general-purpose microprocessors, microcontrollers, digital signal processors (DSPs), field programmable gate array (FPGAs), programmable logic devices (PLDs), controllers, state machines, gated logic, discrete hardware components, dedicated hardware finite state machines, or any other suitable entities that may perform calculations or other manipulations of information. The processors 12 may include one or more application processors, one or more baseband processors, or both, and perform the various functions described herein.

In the electronic device 10 of FIG. 1, the processor 12 may be operably coupled with a memory 14 and a nonvolatile storage 16 to perform various algorithms. Such programs or instructions executed by the processor 12 may be stored in any suitable article of manufacture that includes one or more tangible, computer-readable media. The tangible, computer-readable media may include the memory 14 and/or the nonvolatile storage 16, individually or collectively, to store the instructions or routines. The memory 14 and the nonvolatile storage 16 may include any suitable articles of manufacture for storing data and executable instructions, such as random-access memory, read-only memory, rewritable flash memory, hard drives, and optical discs. In addition, programs (e.g., an operating system) encoded on such a computer program product may also include instructions that may be executed by the processor 12 to enable the electronic device 10 to provide various functionalities.

In certain embodiments, the display 18 may facilitate users to view images generated on the electronic device 10. In some embodiments, the display 18 may include a touch screen, which may facilitate user interaction with a user interface of the electronic device 10. Furthermore, it should be appreciated that, in some embodiments, the display 18 may include one or more liquid crystal displays (LCDs), light-emitting diode (LED) displays, organic light-emitting diode (OLED) displays, active-matrix organic light-emitting diode (AMOLED) displays, or some combination of these and/or other display technologies.

The input structures 22 of the electronic device 10 may enable a user to interact with the electronic device 10 (e.g., pressing a button to increase or decrease a volume level). The I/O interface 24 may enable the electronic device 10 to interface with various other electronic devices, as may the network interface 26. In some embodiments, the I/O interface 24 may include an I/O port for a hardwired connection for charging and/or content manipulation using a standard connector and protocol, such as the Lightning connector provided by Apple Inc. of Cupertino, California, a universal serial bus (USB), or other similar connector and protocol. The network interface 26 may include, for example, one or more interfaces for a personal area network (PAN), such as an ultra-wideband (UWB) or a BLUETOOTH® network, a local area network (LAN) or wireless local area network (WLAN), such as a network employing one of the IEEE 802.11x family of protocols (e.g., WI-FTC)), and/or a wide area network (WAN), such as any standards related to the Third Generation Partnership Project (3GPP), including, for example, a $3^{rd}$ generation (3G) cellular network, universal mobile telecommunication system (UMTS), 4th generation (4G) cellular network, long term evolution (LTE®) cellular network, long term evolution license assisted access (LTE-LAA) cellular network, $5^{th}$ generation (5G) cellular network, and/or New Radio (NR) cellular network, a non-terrestrial network (NTN) (e.g., satellite network, air-to-ground network), and so on. In particular, the network interface 26 may include, for example, one or more interfaces for using a Release-15 cellular communication standard of the 5G specifications that include the millimeter wave (mmWave) frequency range (e.g., 24.25-300 gigahertz (GHz)) and/or any other cellular communication standard release (e.g., Release-16, Release-17, any future releases) that define and/or enable frequency ranges used for wireless communication. The network interface 26 of the electronic device 10 may allow communication over the aforementioned networks (e.g., 5G, Wi-Fi, LTE-LAA, satellite networks, NTNs, and so forth).

The network interface 26 may also include one or more interfaces for, for example, broadband fixed wireless access networks (e.g., WIMAX®), mobile broadband Wireless networks (mobile WIMAX®), asynchronous digital subscriber lines (e.g., ADSL, VDSL), digital video broadcasting-terrestrial (DVB-T®) network and its extension DVB Handheld (DVB-H®) network, ultra-wideband (UWB) network, alternating current (AC) power lines, and so forth.

As illustrated, the network interface 26 may include a transceiver 30. In some embodiments, all or portions of the transceiver 30 may be disposed within the processor 12. The transceiver 30 may support transmission and receipt of various wireless signals via one or more antennas, and thus may include a transmitter and a receiver. The power source 29 of the electronic device 10 may include any suitable source of power, such as a rechargeable lithium polymer (Li-poly) battery and/or an alternating current (AC) power converter.

Figure 2:
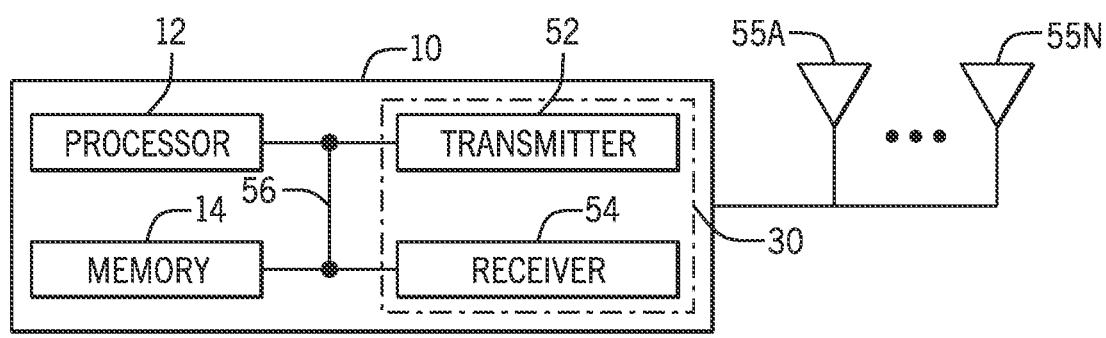
FIG. 2 is a functional diagram of the electronic device of FIG. 1, according to embodiments of the present disclosure.

FIG. 2 is a functional diagram of the electronic device 10 of FIG. 1, according to embodiments of the present disclosure. As illustrated, the processor 12, the memory 14, the transceiver 30, a transmitter 52, a receiver 54, and/or antennas 55 (illustrated as 55A-55N, collectively referred to as an antenna 55) may be communicatively coupled directly or indirectly (e.g., through or via another component, a communication bus, a network) to one another to transmit and/or receive data between one another.

The electronic device 10 may include the transmitter 52 and/or the receiver 54 that respectively enable transmission and reception of data between the electronic device 10 and an external device via, for example, a network (e.g., including base stations and/or non-terrestrial communication hubs) or a direct connection. As illustrated, the transmitter 52 and the receiver 54 may be combined into the transceiver 30. The electronic device 10 may also have one or more antennas 55A-55N electrically coupled to the transceiver 30. The antennas 55A-55N may be configured in an omnidirectional or directional configuration, in a single-beam, dual-beam, or multi-beam arrangement, and so on. Each antenna 55 may be associated with a one or more beams and various configurations. In some embodiments, multiple antennas of the antennas 55A-55N of an antenna group or module may be communicatively coupled a respective transceiver 30 and each emit radio frequency signals that may constructively and/or destructively combine to form a beam. The electronic device 10 may include multiple transmitters, multiple receivers, multiple transceivers, and/or multiple antennas as suitable for various communication standards. In some embodiments, the transmitter 52 and the receiver 54 may transmit and receive information via other wired or wireline systems or means.

As illustrated, the various components of the electronic device 10 may be coupled together by a bus system 56. The bus system 56 may include a data bus, for example, as well as a power bus, a control signal bus, and a status signal bus, in addition to the data bus. The components of the electronic device 10 may be coupled together or accept or provide inputs to each other using some other mechanism.

Figure 3:
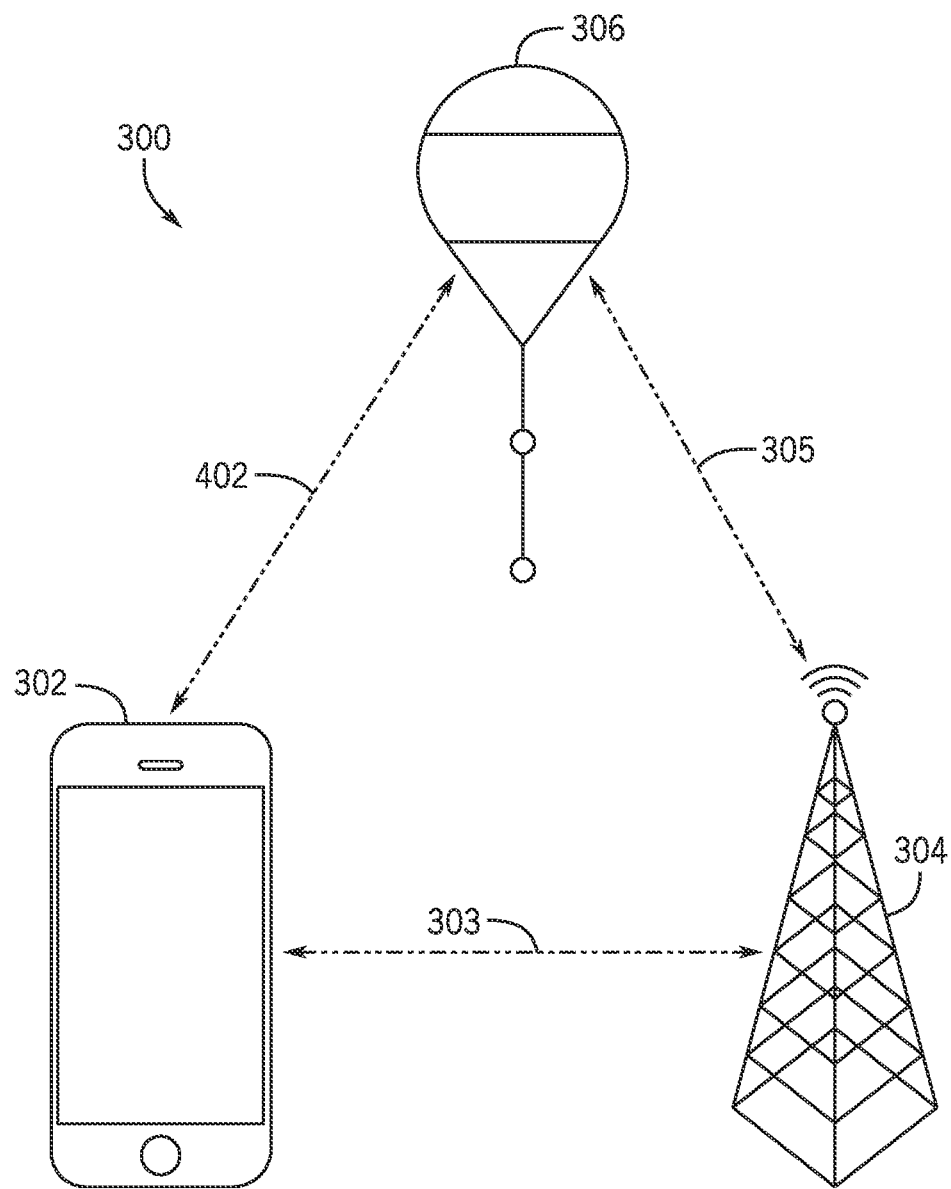
FIG. 3 is a diagram of a system illustrating the relationship between user equipment, a terrestrial communication hub (e.g., a base station), and a non-terrestrial communication hub where the user equipment communicates with the non-terrestrial communication hub via the terrestrial communication hub, according to embodiments of the present disclosure.

FIG. 3 is a diagram of a system 300 illustrating the relationship between user equipment 302, a terrestrial communication hub 304 (e.g., a base station), and a non-terrestrial communication hub 306. The user equipment 302, the terrestrial communication hub 304, and the non-terrestrial communication hub 306 may include at least some of the components of the electronic device shown in FIGS. 1 and 2. As will be discussed in greater detail below, the user equipment 302 may request system information from the terrestrial communication hub 304. The system information may include one or more indications of available frequency bands, such as an uplink band ID and a downlink band ID. It should be noted that while only one non-terrestrial communication hub 306 is illustrated, the terrestrial communication hub 304 may facilitate communications between the user equipment 302 and a network or constellation of non-terrestrial communication hubs including any appropriate number of non-terrestrial communication hubs 306 (e.g., two or more non-terrestrial communication hubs, ten or more non-terrestrial communication hubs, 100 or more non-terrestrial communication hubs, 1,000 or more non-terrestrial communication hubs, and so on).

The user equipment 302 may send a request via data link 303 to the terrestrial communication hub 304 requesting the available uplink and downlink frequencies. In some embodiments, the terrestrial communication hub 304 may determine available uplink and/or downlink frequencies (e.g., those that may enable communication between the user equipment 302 and the non-terrestrial communication hub 306), select an available uplink frequency and/or an available downlink frequency, and send an indication (e.g., band ID) of the available uplink frequency and/or an available downlink frequency to the user equipment 302 via the data link 303. The terrestrial communication hub 304 may do so by receiving availability information from the non-terrestrial communication hub 306 (e.g., periodically, or as the non-terrestrial communication hub 306 deploys one or more frequencies) and storing the availability information in the memory 14 or storage 16 of the terrestrial communication hub 304.

In other embodiments, the terrestrial communication hub 304 may pass the request via data link 305 to the non-terrestrial communication hub 306. The non-terrestrial communication hub 306 may determine available uplink and downlink frequencies based on deployment information (e.g., information regarding which uplink and downlink frequencies are or are not deployed) stored in the memory 14 or the storage 16 of the non-terrestrial communication hub 306. Upon determining the available uplink and downlink frequencies, the non-terrestrial communication hub 306 may send system information including one or more indications of available uplink or downlink frequencies to the terrestrial communication hub 304 via the data link 305. The terrestrial communication hub 304 may then pass the system information received via the data link 305 to the user equipment 302 via the data link 303 and may schedule the user equipment 302 for communication over the available uplink and downlink frequencies. In certain embodiments, the user equipment 302 may request the system information directly from the non-terrestrial communication hub 306.

In another embodiment, the user equipment 302 may communicate directly with the non-terrestrial communication hub 306, as indicated by data link 402. Enabling communication directly between the user equipment 302 and the non-terrestrial communication hub 306 may be advantageous in areas on the edge of the coverage area of the terrestrial communication hub 304, where there may be a weak connection between the user equipment 302 and the terrestrial communication hub 304, or outside of the coverage area of the terrestrial communication hub 304 where there may be no connection at all. For example, if the user equipment 302 is outside of the coverage area of the terrestrial communication hub 304, the user equipment 302 may upload data to and download data from the non-terrestrial communication hub 306 via the data link 402.

As another example, if the user equipment 302 is at the edge of the coverage area of the terrestrial communication hub 304, the data link 402 may supplement a data link (e.g., the data link 303) between the user equipment 302 and the terrestrial communication hub 304. In yet another embodiment, the user equipment 302 may communicate with the non-terrestrial communication hub 306 directly and may also communicate with the non-terrestrial communication hub 306 indirectly via the terrestrial communication hub 304. As may be observed in the system 300, the user equipment 302 may receive data directly from the non-terrestrial communication hub 306 (e.g., via the data link 402) and indirectly from the non-terrestrial communication hub 306 via the terrestrial communication hub 304 (e.g., via the data links 303 and 305). As such, the data links 402 and 303 may supplement each other, and improve the network connectivity of the user equipment 302 (e.g., by increasing bandwidth, reducing latency, decreasing signal-to-noise ratio, and so on).

As previously mentioned, the system 300 may include any appropriate number of non-terrestrial communication hubs 306 in a network or constellation (e.g., two or more non-terrestrial communication hubs, ten or more non-terrestrial communication hubs, 100 or more non-terrestrial communication hubs, 1,000 or more non-terrestrial communication hubs, and so on) communicating with the user equipment 302 and/or the terrestrial communication hub 304 over any number of data links (e.g., one or more data links, two or more data links, ten or more data links, and so on).

Standards (e.g., those promulgated by the 3GPP) and regulations (e.g., those promulgated by the Federal Communications Commission (FCC)) may restrict transmission power output of the user equipment 302. Communicating directly with non-terrestrial communication hubs 306 positioned at a lower orbit may require less transmission power, while communicating with non-terrestrial communication hubs 306 positioned at a higher orbit may require significantly more transmission power. As such, the transmission power used to transmit signals from the user equipment 302 to certain non-terrestrial communication hubs 306 (e.g., aircraft and certain LEO satellites) may fall beneath the restrictions while the transmission power used to transmit signals from the user equipment 302 to other non-terrestrial communication hubs 306 (e.g., certain MEO and/or GEO satellites) may exceed the restrictions. As such, certain embodiments may be suitable for certain lower-orbit satellites, but may be less suitable for other higher-orbit satellites, while other embodiments may be suitable for both lower-orbit and higher-orbit satellites.

As such, in some embodiments, the user equipment 302 may request uplink and/or downlink frequency bands from the terrestrial communication hub 304. The terrestrial communication hub 304 may determine available uplink and/or downlink frequencies (e.g., those that may enable communication between the user equipment 302 and the non-terrestrial communication hub 306), select an available uplink frequency and/or an available downlink frequency, and send an indication of the available uplink frequency and/or an available downlink frequency (e.g., band identifiers (IDs)) to the user equipment 302. In other embodiments, the terrestrial communication hub 304 may request system information including availability information associated with uplink and/or downlink frequencies and/or frequency bands from the non-terrestrial communication hub 306 to determine the available uplink and/or downlink frequencies. Moreover, in some embodiments, the user equipment 302 may request uplink and/or downlink frequencies from the non-terrestrial communication hub 306 directly (without communicating with the intermediary terrestrial communication hub 304).

To enable cohesive operation between NTN communications and cellular communications (e.g., cohesive behavior between the non-terrestrial communication hub 306, the user equipment 302, and the terrestrial communication hub 304), it may be useful to conform NTN communications operation of the user equipment 302 to certain standards (e.g., standards promulgated and set forth by the 3GPP) when the user equipment 302 establishes communication with and communicates with the terrestrial communication hub 304 and/or non-terrestrial communication hub 306. To do so, frequency band IDs may be defined for NTN frequency bands similarly to how certain standards (e.g., 3GPP standards) define band IDs for terrestrial communication frequencies.

Figure 4:
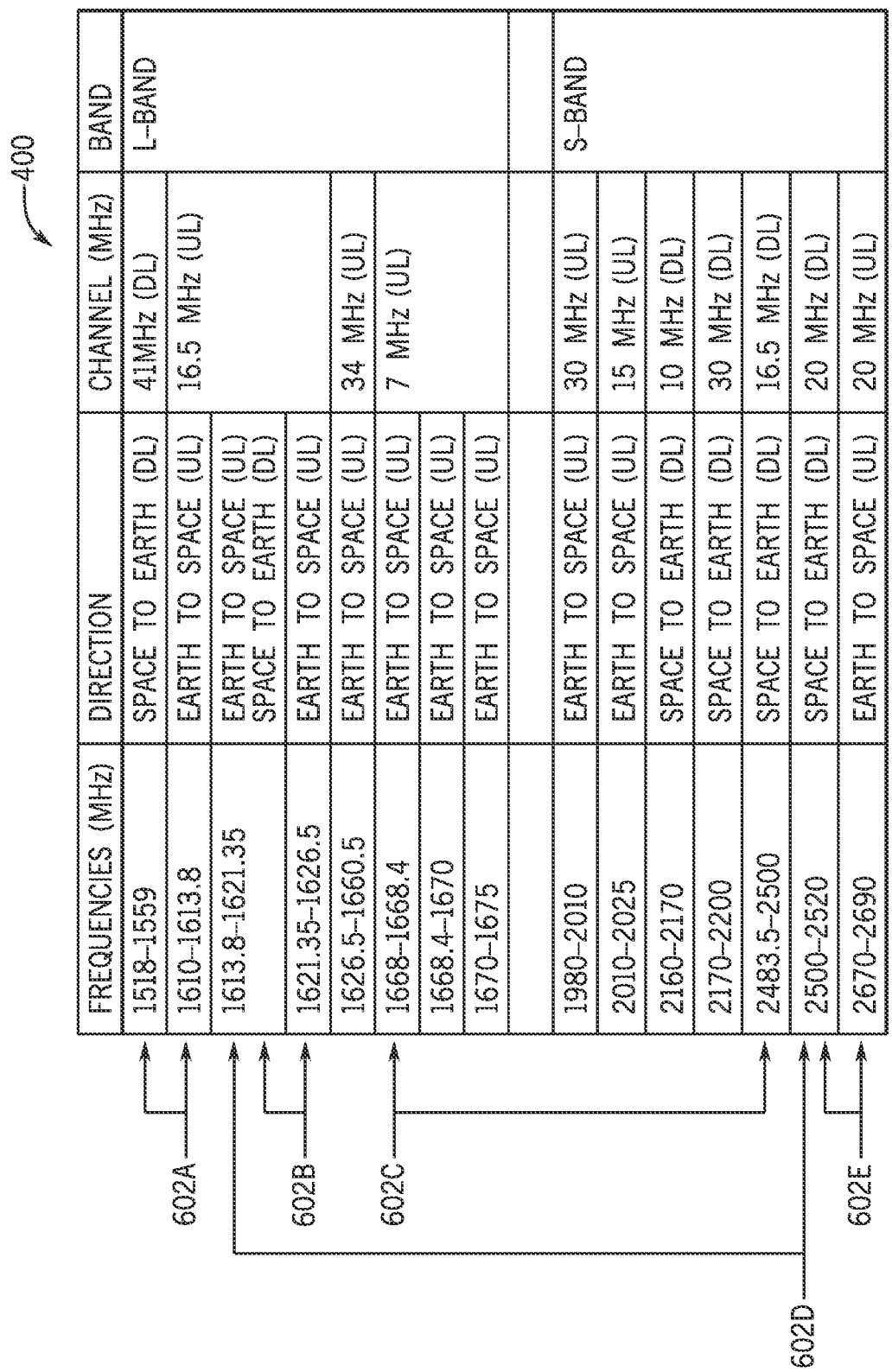
FIG. 4 includes a table illustrating at least some (e.g., non-terrestrial network (NTN)) frequency bands (e.g., L-bands and S-bands) that may be used for user equipment to communicate with the non-terrestrial communication hub of FIG. 3, according to embodiments of the present disclosure.

As previously mentioned, terrestrial communications standards may include fixed uplink and downlink frequency pairs, which may limit the number of frequency pairs and band IDs that may be generated and stored. However, NTN communications allow for dynamic selection of uplink and downlink frequency pairs during deployment. Due to the number of possible uplink and downlink frequency band pairings that may be available for NTN communications, identifying all possible permutations of possible pairings with band IDs would be inefficient. For example, FIG. 4 includes a table 400 illustrating at least some (e.g., non-terrestrial network (NTN)) frequency bands (e.g., L-bands and S-bands) that may be used for user equipment 302 to communicate with the non-terrestrial communication hub 306. The table 400 may include information regarding the frequency band, multiple frequencies within the frequency bands, whether the frequencies are uplink frequencies or downlink frequencies, and channel bandwidth of the multiple frequencies.

As illustrated in the table 400, some NTN frequency bands may be used for uplink (e.g., 1610-1613.8 megahertz (MHz)), some may be used for downlink (e.g., 2160-2170 MHz), and some may be used for both (e.g., 1613.8-1621.35 MHz). As may be observed, in some embodiments L-band frequencies may be paired with S-band frequencies. Arrows 602A, 602B, 602C, 602D, and 602E (collectively referred to as the arrows 602) indicate a portion of the uplink/downlink frequency band pairs that may be generated based on available uplink and downlink frequencies. Assigning all possible permutations of uplink and downlink frequency band pairs (e.g., as shown by the arrows 602) with frequency band IDs may result in an excessively large number of frequency band IDs. Processing and storing the large multitude of frequency band IDs (and their combinations in potential future carrier aggregation scenarios) may be inefficient and resource-intensive.

To avoid such inefficiencies, in one embodiment, NTN uplink and downlink frequency band pairings may be defined and associated with band IDs. Accordingly, the terrestrial communication hub 304 or the non-terrestrial communication hub 306 itself may configure an uplink frequency band ID and a downlink frequency band ID for the user equipment 302 to enable the user equipment 302 to upload and download data using the uplink frequency band associated with the uplink frequency band ID and the downlink frequency band associated with the downlink frequency band ID.

For example, FIG. 5A includes a table 700 illustrating frequency band definitions using a definition scheme corresponding a 3GPP standard pairing protocol. The table 700 may include information such as band IDs, the frequencies to which each band ID correspond, and the frequency type. In particular, the table 700 indicates a frequency band ID, an uplink frequency range corresponding to the band ID, a downlink frequency range corresponding to the band ID, and a type of communication (e.g., frequency-division duplexing (FDD) or time-division duplexing (TDD)) corresponding to the band ID. For example, the band ID n100 has an uplink frequency band of 1980-2010 MHz, a downlink frequency band of 2170-2200 MHz, and is used for FDD satellite (SAT) communication. As another example, the band ID n102 has an uplink frequency band of 1626.5-1660.5 MHz, a downlink frequency band of 1518-1559 MHz, and is used for FDD SAT communication.

The frequency band definitions illustrated in the table 700 may conform to certain cellular communications standards set out by certain standards bodies (e.g., the 3GPP). Particular frequency band IDs (e.g., n41 and n1) may indicate terrestrial frequencies, while other frequency band IDs (e.g., n100 and n102) may indicate satellite or other NTN frequencies. As may be observed from the table 700, each band ID 702 may defined such that each band ID corresponds to both uplink frequencies and downlink frequencies. Some band IDs (e.g., n41) may include terrestrial TDD frequencies, others (e.g., n1) may include terrestrial FDD frequencies, while still other band IDs (e.g., n100 and n102) may correspond to satellite- or NTN-based FDD frequencies. TDD frequencies (e.g., 2496-2690 MHz) may use only one frequency range as both the uplink frequency and the downlink frequency. FDD frequencies may use one frequency for uplink (e.g., 1920 MHz) and a different frequency for downlink (e.g., 1980 MHz). However, using the scheme illustrated in the table 700, although the uplink and downlink frequencies are different, they still correspond to a single band ID.

FIG. 5B includes a table 750 illustrating signaling (e.g., between the terrestrial communication hub 304 and the user equipment 302) indicating the frequency bands using the scheme illustrated in FIG. 5A. The table 750 illustrates examples for signaling of different frequency bands. For example, rows 752, 754, 756, 758, and 760 of table 750 may illustrate various information that may be sent from the non-terrestrial communication hub 306 or the terrestrial communication hub 304 to the user equipment 302 as part of the system information discussed earlier. For example, the signal 752A may include downlink band ID For example, at row 756, the terrestrial communication hub 304 may signal to the user equipment 302 (e.g., in a downlink frequency band field of the system information included in a data frame or packet) to use the downlink frequency band associated with the band ID n100 for downloading data from the non-terrestrial communication hub 306, and signal to the user equipment 302 (e.g., in an uplink frequency band field of the system information included in a data frame or packet) to use the uplink frequency band associated with the band ID n100 for uploading data to the non-terrestrial communication hub 306. Accordingly, the user equipment 302 may use the downlink frequencies 2170-2200 MHz to download data to the non-terrestrial communication hub 306 and the uplink frequencies 1980-2010 MHz to upload data to the non-terrestrial communication hub 306. The signaling scheme illustrated in FIGS. 5A and 5B, that is, using both the downlink and uplink frequencies corresponding to a single band ID, corresponds to or mimics the 3GPP standard pairing protocol.

In some embodiments, the downlink or uplink frequency band of a pair may be "overwritten" by providing a different band ID for the downlink or uplink frequency band. For example, in row 758, the terrestrial communication hub 304 or non-terrestrial communication hub 306 may signal to the user equipment 302 to use the downlink frequency band associated with the band ID n100 for downloading data from the non-terrestrial communication hub 306, and signal to the user equipment 302 to use the uplink frequency band associated with the band ID n102 for uploading data to the non-terrestrial communication hub 306. As such, the user equipment 302 may use the downlink frequency band of 2170-2200 MHz to receive the NTN signal (with corresponding download data) and the uplink frequency band of 1626.5-1660.5 MHz to transmit to the non-terrestrial communication hub 306 (with corresponding upload data). Using different band IDs for downlink and uplink frequency bands may enable flexibility of NTN capabilities and user equipment capabilities and better overall data throughput (e.g., when compared to the 3GPP standard pairing protocol of using a single band ID for both downlink and uplink frequency bands).

In additional or alternative embodiments, each of the NTN frequencies may be defined as separate downlink or uplink frequency bands. That is, each NTN frequency band ID may correspond to only one of a downlink or uplink frequency band. For example, FIG. 6A includes a table 800 illustrating a different frequency band definition scheme than was described in FIGS. 5A and 5B. The table 800 indicates a frequency band ID, an uplink frequency corresponding to the band ID or a downlink frequency corresponding to the band ID, and a type of communication corresponding to the band ID. The band IDs n41 and n1 may include terrestrial frequencies, while the band IDs n100, n101, n102, and n103. For example, the band ID n100 has no uplink frequency band, a downlink frequency band of 2170-2200 MHz, and is used for downlink satellite (DL SAT) communication. As another example, the band ID n101 has an uplink frequency band of 1980-2010 MHz, no downlink frequency band, and is used for DL SAT communication.

FIG. 6B includes a table 850 illustrating signaling (e.g., between the terrestrial communication hub 304 and the user equipment 302) indicating the frequency bands. The table 850 illustrates examples for signaling of different frequency bands and frequencies within the frequency bands. In particular, the table 850 includes the rows 852, 854, 856, 858, and 860, where each row illustrates a communication type for an uplink/downlink deployment (e.g., TDD or FDD), a downlink band ID, and an uplink band ID. The band IDs illustrated in rows 852 and 854 may include terrestrial frequencies, while the band IDs illustrated in rows 856, 858, and 860 may include satellite or NTN frequencies.

For example, at row 856, the terrestrial communication hub 304 may signal to the user equipment 302 (e.g., in a downlink frequency band field included in system information of a data frame or packet) to use the downlink frequency band associated with the band ID n100 for downloading data from the non-terrestrial communication hub 306, and signal to the user equipment 302 (e.g., in an uplink frequency band field included in system information of a data frame or packet) to use the uplink frequency band associated with the band ID n101 for uploading data to the non-terrestrial communication hub 306. Accordingly, the user equipment 302 may use the downlink frequency band of 2170-2200 MHz to download data to the non-terrestrial communication hub 306 and the uplink frequency band of 1980-2010 MHz to upload data to the non-terrestrial communication hub 306.

As with the scheme illustrated in FIGS. 5A and 5B, enabling different band IDs for downlink and uplink frequency bands may provide enhanced flexibility and better overall data throughput (e.g., when compared to the 3GPP standard pairing protocol of using a single band ID for both downlink and uplink frequency bands). Moreover, since each band ID includes only one field of the uplink frequency band and the downlink frequency band, the scheme illustrated in FIGS. 6A and 6B may provide a more efficient way to store information related to the NTN frequency bands.

Figure 7:
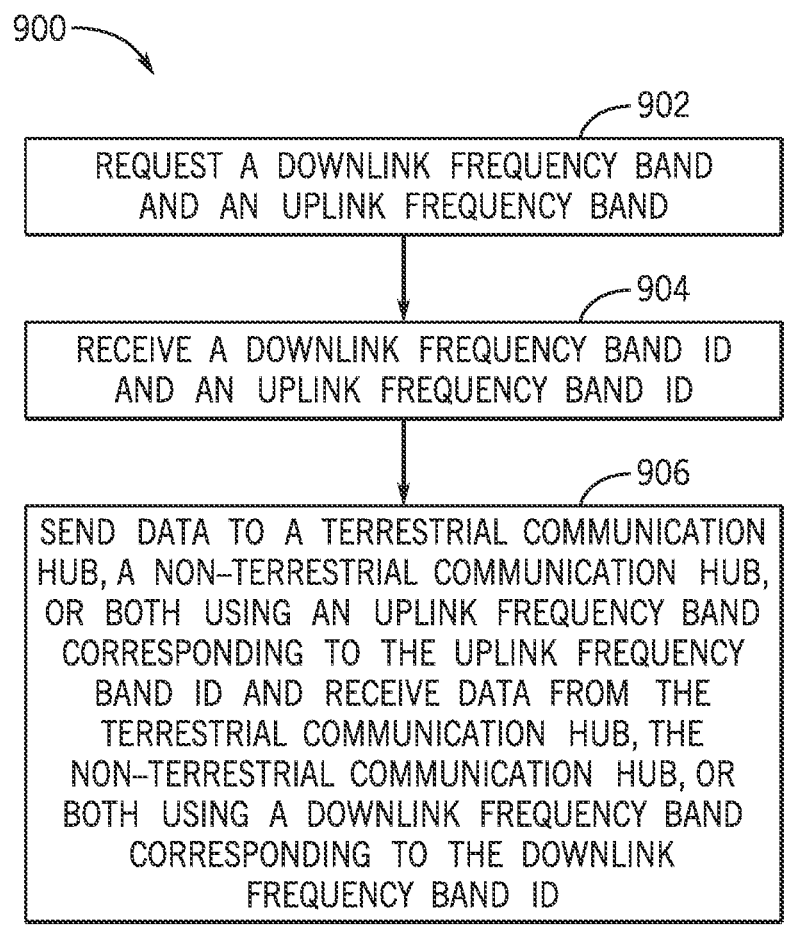
FIG. 7 is a flowchart of a method that enables the user equipment to communicate with the non-terrestrial communication hub of FIG. 3, according to embodiments of the present disclosure.

FIG. 7 is a flowchart of a method 900 that enables the user equipment 302 to communicate with the non-terrestrial communication hub 306. Any suitable device (e.g., a controller) that may control components of the user equipment 302, such as the processor 12, may perform the method 900. In some embodiments, the method 900 may be implemented by executing instructions stored in a tangible, non-transitory, computer-readable medium, such as the memory 14 or storage 16, using the processor 12. For example, the method 900 may be performed at least in part by one or more software components, such as an operating system of the user equipment 302, one or more software applications of the user equipment 302, and the like. While the method 900 is described using steps in a specific sequence, it should be understood that the present disclosure contemplates that the described steps may be performed in different sequences than the sequence illustrated, and certain described steps may be skipped or not performed altogether.

In process block 902, the processor 12 of the user equipment 302 requests a downlink frequency band and an uplink frequency band. As previously discussed, the user equipment 302 may request the available downlink frequencies and available uplink frequencies from the terrestrial communication hub 304, directly from the non-terrestrial communication hub 306 as illustrated in, or both, as illustrated in FIG. 3.

In process block 904, the processor 12 receives, from the terrestrial communication hub 304 or the non-terrestrial communication hub 306, a downlink frequency band ID and an uplink frequency band ID. In some embodiments, the downlink frequency band ID and the uplink frequency band ID may be the same, such as in the example shown in row 756 of FIG. 5B, corresponding to or mimicking the 3GPP standard pairing protocol. In additional or alternative embodiments, the downlink frequency band ID and the uplink frequency band ID may each be associated with a downlink/uplink frequency band pair, but the downlink frequency band ID and the uplink frequency band ID may be different, such as the example shown in row 758 of FIG. 5B, which may provide enhanced flexibility and better overall data throughput (e.g., when compared to the 3GPP standard pairing protocol of using a single band ID for both downlink and uplink frequency bands). In yet another embodiment, the downlink frequency band ID may be associated with a downlink frequency but not an uplink frequency, and the uplink frequency band ID may associated with an uplink frequency but not a downlink frequency, such as the example shown in row 856 of FIG. 6B, which may provide a more efficient way to store information related to the NTN frequency bands.

In process block 906, the user equipment 302 sends data to the terrestrial communication hub 304, the non-terrestrial communication hub 306, or both using an uplink frequency band corresponding to the uplink frequency band ID received from the terrestrial communication hub 304 or the non-terrestrial communication hub 306. Further, the user equipment 302 may receive data from the non-terrestrial communication hub 306 using a downlink frequency band corresponding to the downlink frequency band ID received from the terrestrial communication hub 304. In this manner, the method 900 enables the user equipment 302 to communicate with the non-terrestrial communication hub 306.

Figure 8:
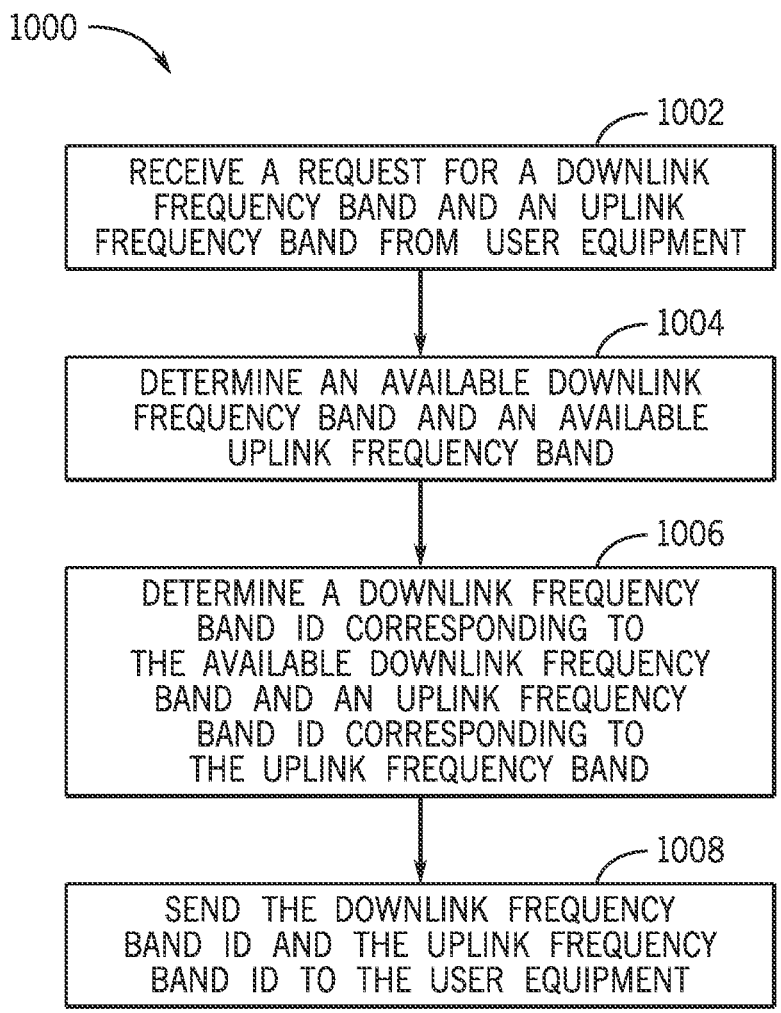
FIG. 8 is a flowchart of a method that enables the terrestrial communication hub to determine the downlink and uplink frequency band IDs to send to the user equipment of FIG. 3, according to embodiments of the present disclosure.

FIG. 8 is a flowchart of a method 1000 that enables the terrestrial communication hub 304, the non-terrestrial communication hub 306, or both, to determine the downlink and uplink frequency band IDs to send to the user equipment 302. Any suitable device (e.g., a controller) that may control components of the terrestrial communication hub 304, the non-terrestrial communication hub 306, or both, such as the processor 12, may perform the method 1000. In some embodiments, the method 1000 may be implemented by executing instructions stored in a tangible, non-transitory, computer-readable medium, such as the memory 14 or storage 16, using the processor 12. For example, the method 1000 may be performed at least in part by one or more software components, such as an operating system of the terrestrial communication hub 304, the non-terrestrial communication hub 306, or both, one or more software applications of the terrestrial communication hub 304, the non-terrestrial communication hub 306, or both, and the like. While the method 1000 is described using steps in a specific sequence, it should be understood that the present disclosure contemplates that the described steps may be performed in different sequences than the sequence illustrated, and certain described steps may be skipped or not performed altogether.

In process block 1002, the processor 12 of the terrestrial communication hub 304 and/or the non-terrestrial communication hub 306 receives a request for a downlink frequency band and an uplink frequency band from the user equipment 302. In process block 1004, the processor 12 determines available downlink frequencies band and available uplink frequencies. The terrestrial communication hub 304 or the non-terrestrial communication hub 306 may determine the available frequencies by referencing a defined set of non-terrestrial network (NTN) frequencies and determining which frequencies are not presently deployed (e.g., which frequencies are not presently facilitating communications). The frequency bands may be frequency-division duplexing (FDD) or time-division duplexing (TDD).

In process block 1006, the processor 12 determines a downlink frequency band ID corresponding to the available downlink frequency band and an uplink frequency band ID corresponding to the available uplink frequency band. In some embodiments, the processor 12 may select the downlink frequency band ID and the uplink frequency band ID to be the same, such as in the example shown in row 756 of FIG. 5B, corresponding to or mimicking the 3GPP standard pairing protocol. In additional or alternative embodiments, the downlink frequency band ID and the uplink frequency band ID may each be associated with a pair of downlink/uplink frequencies, but the downlink frequency band ID and the uplink frequency band ID may be different, such as the example shown in row 758 of FIG. 5B. This may be because, for example, the processor 12 determines one of the pair of the downlink frequencies and the uplink frequencies of a band ID is unavailable (e.g., already being used). Thus, enabling selecting of a downlink frequency band ID different from a uplink frequency band ID may provide enhanced flexibility and better overall data throughput (e.g., when compared to the 3GPP standard pairing protocol of using a single band ID for both downlink and uplink frequency bands). In yet another embodiment, the downlink frequency band ID may be associated with downlink frequencies but not with uplink frequencies, and the uplink frequency band ID may associated with an uplink frequency but not a downlink frequency, such as the example shown in row 856 of FIG. 6B. This may provide a more efficient way to store information related to the NTN frequency bands.

In process block 1008, the processor 12 sends the downlink frequency band ID and the uplink frequency band ID to the user equipment 302. The user equipment 302 may then use the uplink and downlink frequency band IDs to access available frequencies by which the user equipment 302 may communicate with the non-terrestrial communication hub 306. In this manner, the method 1000 enables the terrestrial communication hub 304 and/or the non-terrestrial communication hub 306 to determine the downlink and uplink frequency band IDs to send to the user equipment 302.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ," it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method comprising:
   receiving, via at least one processor, a request from user equipment to send data to and receive data from a non-terrestrial communication hub;
   receiving, from the user equipment, a request for available downlink frequency bands and available uplink frequency bands configured to establish non-terrestrial communication between a non-terrestrial network and the user equipment;
   determining, via the at least one processor, a downlink frequency band and an uplink frequency band based on the request for the available downlink frequency bands and the available uplink frequency bands;
   determining, via the at least one processor, a downlink frequency band identifier corresponding to the downlink frequency band and an uplink frequency band identifier corresponding to the uplink frequency band; and
   sending, via the at least one processor, the downlink frequency band identifier and the uplink frequency band identifier to the user equipment.

2. The method of claim 1, wherein the downlink frequency band is the same as the uplink frequency band.

3. The method of claim 1, wherein the downlink frequency band is different than the uplink frequency band.

4. The method of claim 1, wherein the downlink frequency band identifier is the same as the uplink frequency band identifier.

5. The method of claim 1, wherein the downlink frequency band identifier is different than the uplink frequency band identifier.

6. A terrestrial communication hub, comprising:
   a receiver configured to receive data from user equipment;
   a transmitter configured to send data to the user equipment; and
   at least one processor configured to:
      cause the receiver to receive a request from the user equipment to communicate with a non-terrestrial communication hub;
      receive a first request from the user equipment for an available downlink frequency band configured to establish downlink communication between a non-terrestrial network and the user equipment;
      receive a second request from the user equipment for an available uplink frequency band configured to establish downlink communication between the non-terrestrial network and the user equipment;
      determine the available downlink frequency band and the available uplink frequency band based on the first request and the second request;
      determine a downlink frequency band identifier corresponding to the available downlink frequency band and an uplink frequency band identifier corresponding to the available uplink frequency band; and
      cause the transmitter to send the downlink frequency band identifier and the uplink frequency band identifier to the user equipment.

7. The terrestrial communication hub of claim 6, wherein the downlink frequency band identifier does not correspond to an uplink frequency band.

8. The terrestrial communication hub of claim 6, wherein the uplink frequency band identifier does not correspond to a downlink frequency band.

9. The terrestrial communication hub of claim 6, wherein the available downlink frequency band and the available uplink frequency band are configured for frequency-division duplexing communication.

10. The terrestrial communication hub of claim 6, wherein the downlink frequency band identifier is paired with the uplink frequency band identifier.

11. The terrestrial communication hub of claim 6, wherein the available downlink frequency band and the available uplink frequency band are between 1.5 and 1.7 gigahertz.

12. The terrestrial communication hub of claim 6, wherein the available downlink frequency band and the available uplink frequency band are between 1.9 and 2.7 gigahertz.

13. The terrestrial communication hub of claim 6, wherein the available downlink frequency band is between 1.5 and 1.7 gigahertz and the available uplink frequency band is between 1.9 and 2.7 gigahertz.

14. The terrestrial communication hub of claim 6, wherein the processor is configured to:
   receive availability information from the non-terrestrial communication hub; and
   determine the available downlink frequency band and the available uplink frequency band based on the first request, the second request, and the availability information.

15. One or more tangible, non-transitory, machine-readable media comprising machine-readable instructions, wherein the instructions are configured to cause at least one processor of user equipment to:
   cause transmission circuitry of the user equipment to transmit a first request to send data to and receive data from a network of non-terrestrial communication hubs;
   cause the transmission circuitry of the user equipment to transmit a second request for available uplink frequency bands and available downlink frequency bands configured to establish non-terrestrial communication between the network of non-terrestrial communication and the user equipment;
   cause receiving circuitry of the user equipment to receive a downlink frequency band identifier corresponding to downlink frequencies and an uplink frequency band identifier corresponding to uplink frequencies based on the second request;

cause the transmission circuitry to upload data to the network of non-terrestrial communication hubs over the uplink frequencies; and cause the receiving circuitry to download data from the network of non-terrestrial communication hubs over the downlink frequencies.

16. The one or more tangible, non-transitory, machine-readable media of claim 15, wherein the instructions are configured to cause the at least one processor to cause transmission circuitry to transmit the first request and the second request to a terrestrial communication hub.

17. The one or more tangible, non-transitory, machine-readable media of claim 16, wherein the terrestrial communication hub is configured to determine the downlink frequencies corresponding to the downlink frequency band identifier and the uplink frequencies corresponding to the uplink frequency band identifier based on availability information received from the network of non-terrestrial communication hubs.

18. The one or more tangible, non-transitory, machine-readable media of claim 16, wherein the instructions are configured to cause the at least one processor to transmit the first request and the second request to a non-terrestrial communication hub of the network of non-terrestrial communication hubs, wherein the non-terrestrial communication hub is configured to determine the downlink frequencies and the uplink frequencies.

19. The one or more tangible, non-transitory, machine-readable media of claim 15, wherein the network of non-terrestrial communication hubs comprises a spaceborne orbital satellite, a satellite balloon, a high-altitude platform station, or any combination thereof.

20. The one or more tangible, non-transitory, machine-readable media of claim 15, wherein the wherein the downlink frequencies are different than the uplink frequencies.

* * * * *